United States Patent [19]

Murdock et al.

[11] Patent Number: 5,757,960

[45] Date of Patent: May 26, 1998

[54] METHOD AND SYSTEM FOR EXTRACTING FEATURES FROM HANDWRITTEN TEXT

[76] Inventors: Michael Chase Murdock, 1165 Starwood Pass, Lake In The Hills, Ill. 60102; Shay-Ping Thomas Wang, 1701 Edgewood La., Long Grove, Ill. 60047; Nicholas Mikulas Labun, 1325 N. State Pkwy., Chicago, Ill. 60610

[21] Appl. No.: 808,707

[22] Filed: Feb. 28, 1997

Related U.S. Application Data

[63] Continuation of Ser. No. 315,784, Sep. 30, 1994, abandoned.

[51] Int. Cl.[6] .................. G06K 9/00; G06K 9/46; G06K 9/66
[52] U.S. Cl. .................. 382/187; 382/190; 382/195
[58] Field of Search .................. 382/122, 186, 382/187, 190, 191, 195

[56] References Cited

U.S. PATENT DOCUMENTS

| | | | |
|---|---|---|---|
| 5,058,182 | 10/1991 | Kuan et al. | 382/187 |
| 5,101,437 | 3/1992 | Plamondon | 382/119 |
| 5,151,951 | 9/1992 | Ueda et al. | 382/195 |
| 5,313,528 | 5/1994 | Nishida | 382/187 |

*Primary Examiner*—Andrew W. Johns
*Assistant Examiner*—Monica S. Davis
*Attorney, Agent, or Firm*—Michael K. Lindsey; Jeffrey G. Toler

[57] ABSTRACT

A handwriting recognition system achieves a higher recognition rate by using a feature extraction method which computes features based on multiple data frames. A plurality of data frames is generated from handwritten text received by the system. Each data frame includes samples taken from the handwritten text. Individual-frame features are extracted from individual data frames, and in turn, multi-frame features are extracted from individual-frame features which correspond to different data frames.

17 Claims, 4 Drawing Sheets

METHOD AND SYSTEM FOR EXTRACTING FEATURES FROM HANDWRITTEN TEXT

RELATED INVENTIONS

This is a continuation of application Ser. No. 08/315,784 filed Sep. 30, 1994 and now abandoned.

The present invention is related to the following invention which is assigned to the same assignee as the present invention:

(1) "Method and System for Recognizing a Boundary Between Characters in Handwritten Text", having Ser. No. 08/304,008 filed on Sep. 9, 1994.

The subject matter of the above-identified related invention is hereby incorporated by reference into the disclosure of this invention.

TECHNICAL FIELD

This invention relates generally to handwriting recognition systems and, in particular, to a method and system for extracting features from a sample of handwritten text.

BACKGROUND OF THE INVENTION

In fields such as acoustics, seismology, economic forecasting, and handwriting recognition it is necessary to utilize technologies which perform temporal pattern recognition. Generally speaking, a temporal pattern may be defined as a sequence of samples taken from a signal over a finite period of time, wherein each sample corresponds to a discrete interval during the period.

The prior art teaches four different techniques for performing temporal pattern recognition. These techniques are: tapped delay lines used in conjunction with a conventional pattern recognition, syntactic pattern recognition, time delay neural networks, and hidden Markov modeling. These approaches and their respective shortcomings are described in the following.

Some practitioners of the prior art have attempted to recognize temporal patterns by using a slightly modified method of conventional, or non-temporal, pattern recognition in which a sequence of input samples is partitioned with a tapped delay line. This means that if n delay elements are used in a tapped delay line, then a sequence of n+1 samples can be presented to a non-temporal classifier in parallel and processed as a single pattern. Thus, for a particular application, if a temporal pattern is composed of 100 samples, a 99-tap delay line is used to present the entire pattern, at once, to the classifier. The problem with this approach is that the number of inputs to the classifier can quickly grow too large, and thus become unmanageable, for temporal patterns that are defined over a large number of samples.

Syntactic pattern recognition is a pattern recognition technique based on the assumption that a temporal pattern is a composition of primitive sub-pattern elements. Under this-assumption, sub-patterns may be related with a syntax. Using a syntax, it is then possible to define a formal grammar which recognizes the presence or absence of a particular pattern of primitives. The representational capability of this technique generally exceeds that found in other methods of pattern recognition and is thus the primary appeal of syntactic pattern recognition. However, as the complexity of a pattern increases, it becomes increasingly difficult to define a formal grammar. Additionally, once a grammar has been defined it is adversely affected by unexpected variations in the patterns and class definitions.

Time delay neural networks (TDNNs) are a class of neural networks in which the temporal dynamics of patterns are coded in the TDNN architecture with delay-like elements and captured during the training phase of the TDNN. Researchers have used this class of neural network for handwriting and speech recognition. The disadvantage of using a TDNN for temporal pattern recognition is that pattern warping and compression must be captured during the training phase, resulting in a training phase which is very computational intensive and thus very time consuming.

Hidden Markov modeling (HMM) is a probabilistic technique for the study of temporal patterns. This technique uses stochastic methods to generate a time series which is then analyzed by a parametric model. A hidden Markov model has two components: a finite-state Markov chain and a finite set of output probability distributions.

An immediate difficulty with HMM is its complexity, which leads to problems in implementation. In practice there are a large number of inter-related tuning parameters, and some of the tuning parameters require a priori knowledge that often is not available. In addition, the training samples used for HMM must be selected according to fairly complex criteria. Another drawback of implementing HMM is that the computational costs in the forward-backward computation (which is used for maximum likelihood estimation of the model parameters) can be prohibitively expensive.

A handwritten stroke of text is an example of a temporal pattern. In fact, prior art handwriting recognition systems have, at one time or another, incorporated the above-described techniques of performing temporal pattern recognition. However, such handwriting recognition systems suffered from the same disadvantages as given above.

In summary, there is a need for a technique of performing temporal pattern recognition which is insensitive to unexpected variations in input patterns and does not require an overly complex classifier. Furthermore, there is a need for a technique which does not require a lengthy training phase. A technique offering such advantages could be used in a handwriting recognition system to vastly increase the system's performance.

SUMMARY OF THE INVENTION

It is thus an advantage of the present invention to simplify temporal pattern recognition in a handwriting recognition system by providing a method for extracting features from an input pattern. The provided method reduces the overall complexity of the system.

In a system for recognizing a plurality of characters from a sample of handwritten text, an embodiment of the present invention provides a method for extracting a plurality of features. The system utilizes a classifier which responds to the plurality of features extracted from the sample of handwritten text. The method entails the following steps. First, handwritten text is received. Samples are taken from the handwritten text to form a plurality of individual sample datum. The sample datum are partitioned into a plurality of data frames, each data frame having at least two of the plurality of sample datum. Next, a plurality of individual-frame feature are extracted from the plurality of data frames. Each of the plurality of individual-frame features corresponds to one of the plurality of data frames. Finally, a multi-frame feature is extracted which corresponds to a specific data frame of the plurality of data frames. The multi-frame feature is extracted from one of the following: at least two of the plurality of individual-frame features; at least two of the plurality of data frames; or at least one of the plurality of individual-frame features and at least one of the plurality of data frames.

In another embodiment of the present invention there is provided a method for recognizing a character from a sample of handwritten text. The method includes the following steps. First, handwritten text is received. Samples are taken from the handwritten text to form a plurality of individual sample datum. The sample datum are partitioned into a plurality of data frames, each data frame having at least two of the plurality of sample datum. Next, a plurality of individual-frame feature are extracted from the plurality of data frames. Each of the plurality of individual-frame features corresponds to one of the plurality of data frames. Finally, a multi-frame feature is extracted which corresponds to a specific data frame of the plurality of data frames. The multi-frame feature is extracted from one of the following: at least two of the plurality of individual-frame features; at least two of the plurality of data frames; or at least one of the plurality of individual-frame features and at least one of the plurality of data frames. Next, a feature frame is formed which corresponds to the specific data frame and includes the multi-frame feature. The feature frame is classified by computing at least one discriminant function. Finally, the character is recognized by examining the result of computing the at least one discriminant function.

A further embodiment of the present invention is provided in a system for recognizing a plurality of characters from a sample of handwritten text, the system utilizing a classifier which responds to a plurality of features extracted from the sample of handwritten text. This embodiment of the present invention provides a sub-system for extracting the plurality of features. The sub-system includes input means for receiving the sample of handwritten text and sampler means, operably coupled to the input means, for sampling the handwritten text to form a plurality of sample datum. Partition means, operably associated with the sampler means, are further provided for partitioning the plurality of sample datum into a plurality of data frames, each of the plurality of data frames having at least two of the plurality of sample datum. First extraction means, operably associated with the partition means, extract a plurality of individual-frame features from the plurality of data frames, each of the plurality of individual-frame features having a magnitude and corresponding to one of the plurality of data frames. Second extraction means, operably associated with the first extraction means, extract a multi-frame feature, which corresponds to a specific data frame of the plurality of data frames, from one of: at least two of the plurality of individual-frame features, at least two of the plurality of data frames, and at least one of the plurality of individual-frame features and at least one of the plurality of data frames.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
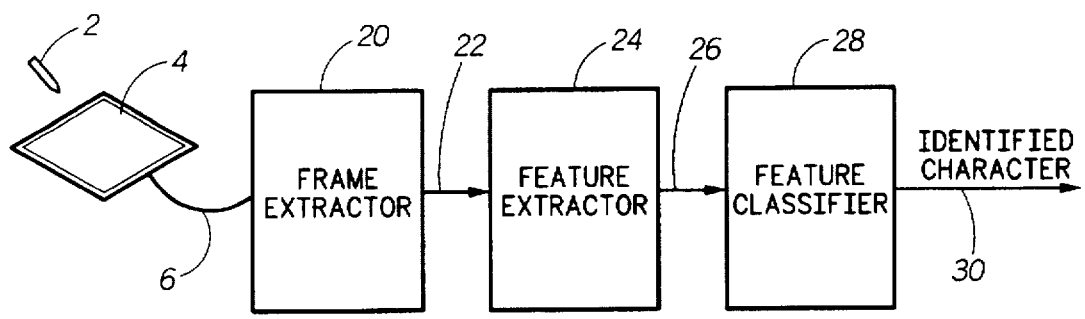
FIG. 1 illustrates a block diagram of a handwriting recognition system.

FIG. 1 illustrates a block diagram of a handwriting recognition system. Pen or stylus 2 is used to enter handwritten text onto digitizer tablet 4. Digitizer tablet 4 provides a plurality of coordinate pairs, which represent the handwritten text, via bus 6 to frame extractor 20. Frame extractor 20 creates a plurality of data frames. Each data frame comprises a set of coordinate pairs. The data frames generated by frame extractor 20 are passed across bus 22 to feature extractor 24. Feature extractor 24 processes the data frame to extract a set of features, or measurements, that contain information which is similar to the data frame but with reduced dimensionality. The features generated by feature extractor 24, which contains the method and system in accordance with several embodiments of the present invention, are passed across bus 26 to feature classifier 28. Feature classifier 28 identifies characters from the handwritten text based on the extracted features it receives. The identity of the characters is generated as output of the handwriting recognition system on bus 30.

In an embodiment of the present invention herein disclosed, the system depicted by FIG. 1 may be used to identify characters from many different languages and alphabets. For example, a set of identifiable characters for recognizing English text would include the upper and lower case English alphabet, numerals, or punctuation marks.

A user of such a system uses pen 2 to write text onto digitizer tablet 4. Digitizer tablet 4 captures handwritten text and converts it into a digital format. Essentially, digitizer tablet 4 provides a flat surface upon which a user writes text. The surface may be represented as a coordinate plane which has an x-axis and y-axis. Thus, a point on the surface may be represented by a coordinate pair (x, y). The surface includes a flat panel of charge coupled devices which are sensitive to the motion of the tip of pen 2, and the surface possibly includes a liquid crystal display (LCD) for pixel display of the motion of pen 2.

The position and movement of pen 2 is captured by the panel and digitized as a sequence of coordinate pairs (x, y), while the user is writing on the surface. The sequence of coordinate pairs is then passed via bus 6 to frame extractor 20.

One of ordinary skill in the art will appreciate that frame extractor 20 is not limited to receiving user input from a digitizer tablet and that other devices, for example a computer vision system or optical scanner, can also be used to provide user input to frame extractor 20.

Operation of the handwriting recognition system commences when a user writes a stroke of handwriting onto digitizer tablet 4 with pen 2. A stroke is defined as a sequence of samples taken from the handwriting, beginning when the pen initially contacts the writing surface of digitizer tablet 4 and ending when the pen subsequently breaks contact with the writing surface. A stroke may include part of a character, a complete character, or many characters. Essentially, a stroke comprises a sequence of coordinate pairs. Each coordinate pair is typically coded as one or more digital words and transmitted to frame extractor 20 using bus 6.

Frame extractor 20 creates a plurality of data frames from a stroke of handwriting. Each data frame comprises a plurality of coordinate pairs. Although a data frame may contain any number of coordinate pairs, in a preferred embodiment of the present invention, each data frame includes a sequence of 15 coordinate pairs. Essentially, a data frame codes only a fraction of one character. A very high level of accuracy and robustness is obtained by incrementally accumulating recognition evidence by classifying the data frames. In addition, the use of data frames allows greater immunity to hand/pen jitter, character flourishes, and noise from digitizer tablet 4.

The data frames generated by frame extractor 20 are transferred across bus 22 to feature extractor 24. Feature extractor 24 processes the data frames to extract a set of features, or measurements, that contain significant information from the data frame but with reduced dimensionality. Examples of features which can be extracted are average rectilinear and angular velocity, either of which may be calculated from the coordinate pairs of a data frame. Feature extractor 24 also extracts multi-frame features by using a method, such as the method depicted by FIG. 2.

The feature extraction, which is performed on the data frames, results in a representation of the data frames which characterizes the relevant features of the handwritten text. It can be regarded as a data reduction procedure that retains vital characteristics of the handwritten text while eliminating the undesirable interference from irrelevant characteristics of the text, thus easing the decision-making process of feature classifier 28.

Feature classifier 28 identifies characters from the handwritten text based on the extracted features it receives across bus 26. In general, a feature classifier makes a decision as to which class an input pattern belongs. Specifically, feature classifier 28 implements one or more discriminant functions, each of which utilizes the extracted features. The discriminant functions are used to determine the class to which the extracted features belong. Each class is labeled with a character identity. After receiving a sufficient number of extracted features, feature classifier 28 generates the identity of the character as an output of the handwriting recognition system on bus 30.

Figure 2:
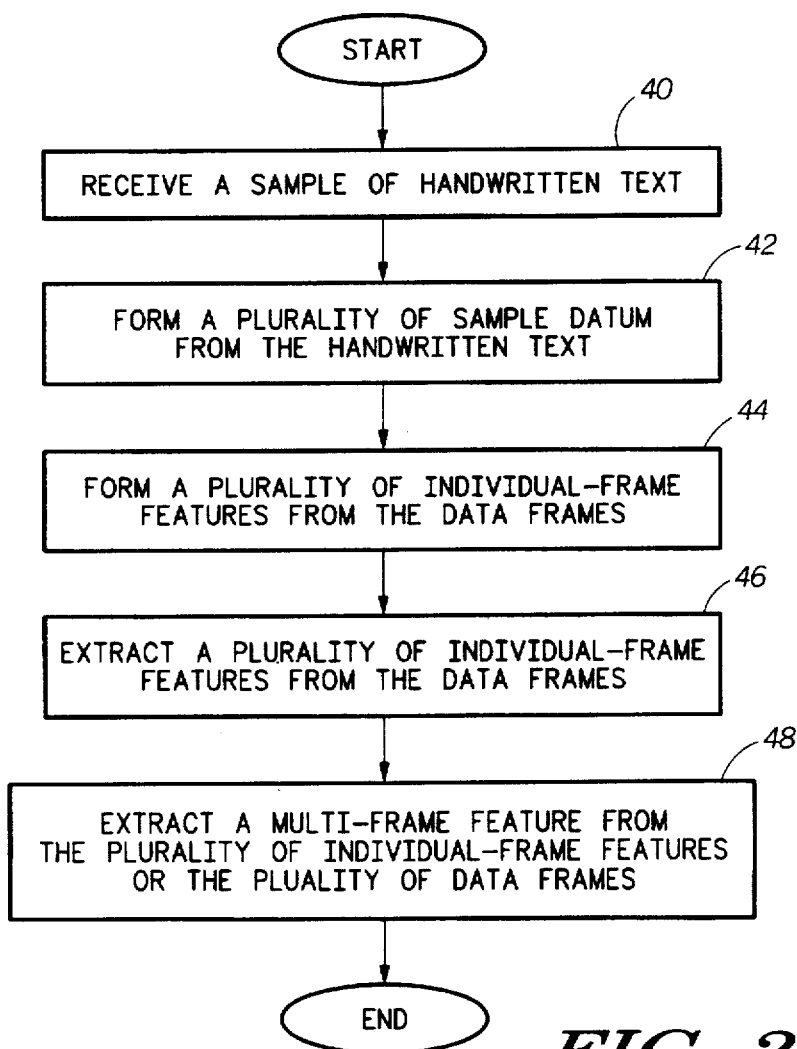
FIG. 2 illustrates a flow diagram of a method of extracting multi-frame features in accordance with a preferred embodiment of the present invention.

FIG. 2 illustrates a flow diagram of a method of extracting multi-frame features in accordance with a preferred embodiment of the present invention. In box 40, samples of handwritten text are received. In box 42, a plurality of samples are taken from the handwritten text. Generally, these samples are a sequence of coordinates, as described above for FIG. 1. In box 44, a plurality of data frames are formed from the samples. Each data frame includes at least one sample, and, in the preferred embodiment, the data frame includes a sequence of coordinate pairs.

Next, in box 46, a plurality of individual-frame features are extracted from the data frames. Each individual-frame feature corresponds to one of the data frames, and more than one individual-frame feature may be extracted from a given data frame. Examples of individual-frame features which may be extracted are average rectilinear velocity, curvilinear velocity, angular velocity, stroke angle, data frame index, stroke curvature, Fourier coefficients, or coefficients of a polynomial.

In box 48, a multi-frame feature is extracted from the individual-frame features, the data frames, or a combination thereof. Each multi-frame feature corresponds to one of the data frames. Two examples of multi-frame features, feature continuity and feature persistence, are described below.

Feature continuity is an indicator of whether the magnitudes of individual-frame features extracted from a sequence of data frames are stable between adjacent data frames. One example of feature continuity is the following:

$$f_{mf}(t) = 0, \text{if}\{f_{if}(t) - f_{if}(t-1)\} > u \qquad \text{Equation 1}$$
$$1, \text{if}\{f_{if}(t) - f_{if}(t-1)\} < u$$

where $f_{mf}(t)$ represents a multi-frame feature corresponding to the $t^{th}$ data frame; where $f_{if}(t)$ represents the magnitude of the individual-frame feature extracted from the $t^{th}$ data frame; where $f_{if}(t-1)$ represents the magnitude of the individual-frame feature extracted from the $(t-1)^{th}$ data frame; u represents a threshold value; and t represents an integer.

Another example of feature continuity is the following:

$$f_{mf}(t) = 0, \text{if}\{f_{if}(t) - f_{if}(t+1)\} > u \qquad \text{Equation 2}$$
$$1, \text{if}\{f_{if}(t) - f_{if}(t+1)\} < u$$

where $f_{mf}(t)$ represents a multi-frame feature corresponding to the $t^{th}$ data frame; where $f_{if}(t)$ represents the magnitude of the individual-frame feature extracted from the $t^{th}$ data frame; where $f_{if}(t+1)$ represents the magnitude of the individual-frame feature extracted from the $(t+1)^{th}$ data frame; u represents a threshold value; and t represents an integer.

A further example of feature continuity is the following:

$$f_{mf}(t) = 0, \text{if} \quad \text{NOT}\{\{f_{if}(t) - f_{if}(t-1)\} < u\}\text{AND} \qquad \text{Equation 3}$$
$$\{\{f_{if}(t) - f_{if}(t+1)\} < u\};$$
$$1, \text{if} \quad \{\{f_{if}(t) - f_{if}(t-1)\} < u\}\text{AND}$$
$$\{\{f_{if}(t) - f_{if}(t+1)\} < u\}$$

where $f_{mf}(t)$ represents a multi-frame feature corresponding to the tth data frame; where $f_{if}(t)$ represents the magnitude of the individual-frame feature extracted from the $t^{th}$ data frame; where $f_{if}(t-1)$ represents the magnitude of the individual-frame feature extracted from the $(t-1)^{th}$ data frame; where $f_{if}(t+1)$ represents the magnitude of the individual-frame feature extracted from the $(t+1)^{th}$ data frame; u represents a threshold value; and t represents an integer.

Feature persistence is a way to quantify the degree to which the values of individual-frame features have remained constant over a sequence of data frames. An example of feature persistence is the following:

$$f_{mf}(t) = n+1, \text{if} f_{if}(t) > 0 \text{ AND } f_{if}(t-1) > 0 \qquad \text{Equation 4}$$
$$\ldots \text{AND} f_{if}(t-n) > 0$$
$$-(n+1), \text{if} f_{if}(t) < 0 \text{ AND } f_{if}(t-1) < 0$$
$$\ldots \text{AND} f_{if}(t-n) < 0$$

where $f_{mf}(t)$ represents a multi-frame feature corresponding to the $t^{th}$ data frame; where $f_{if}(t)$ represents the magnitude of the individual-frame feature extracted from the $t^{th}$ data frame; where $f_{if}(t-1)$ represents the magnitude of the individual-frame feature extracted from the $(t-1)^{th}$ data frame; where $f_{i,j}(t-1)$ represents the magnitude of the individual-frame feature extracted from the $(t-1)^{th}$ data frame; and t and n represent integers.

Figure 3:
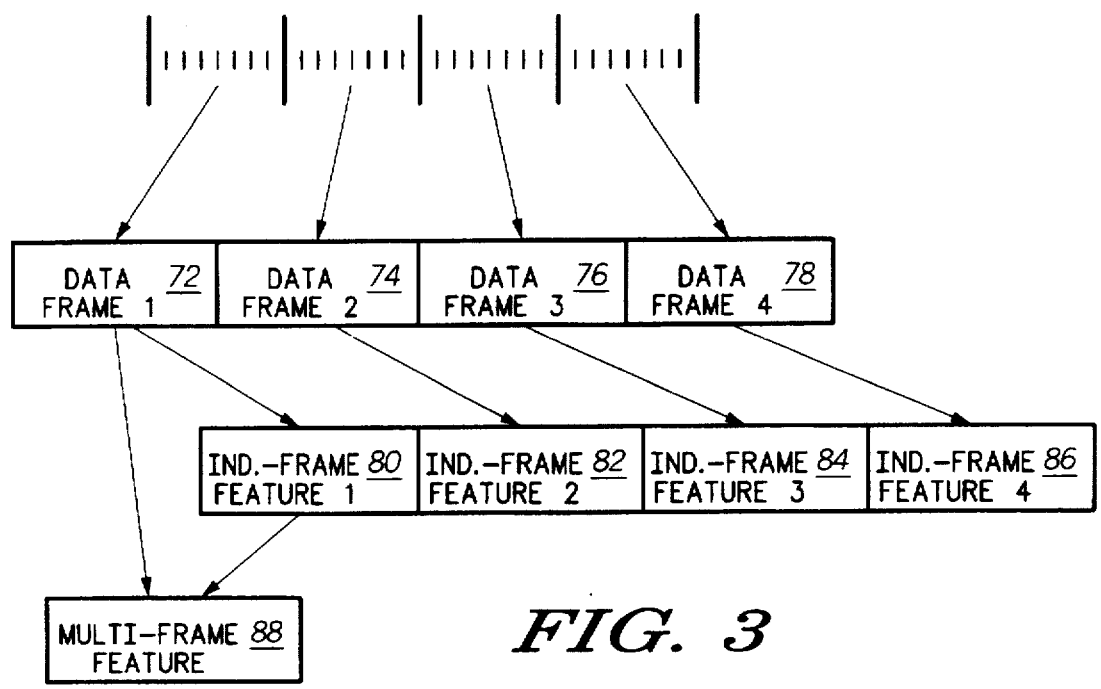
FIG. 3 illustrates a conceptual diagram of extracting a multi-frame feature from a data frame and an individual-frame feature in conformity with one embodiment of the present invention.

FIG. 3 illustrates a conceptual diagram of extracting a multi-frame feature from a data frame and an individual-frame feature in conformity with one embodiment of the present invention. Sample sequence 60 is partitioned into a sequence of data frames. In the example shown, the sequence of data frames is represented by data frames 72, 74, 76, and 78. In turn, a corresponding sequence of individual-frame features is extracted from the data frames. The diagram shows that individual-frame features 80, 82, 84, and 86 are extracted from data frames 72, 74, 76, and 78, respectively. Multi-frame feature 88 is extracted from data frame 72 and individual-feature frame 80.

Figure 4:
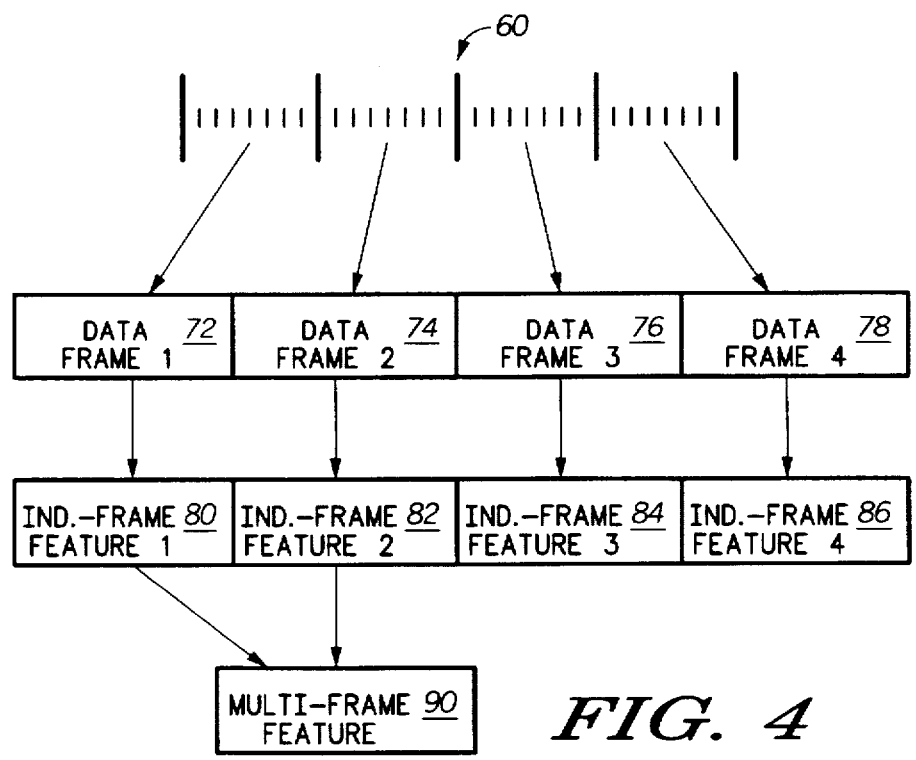
FIG. 4 illustrates a conceptual diagram of extracting a multi-frame feature from two individual-frame features in conformity with another embodiment of the present invention.

FIG. 4 illustrates a conceptual diagram of extracting a multi-frame feature from two individual-frame features in conformity with another embodiment of the present invention. Sample sequence 60 is processed in the same manner as described for FIG. 3 to generate a sequence of individual-frame features. Multi-frame feature 90 is extracted from individual-frame feature 80 and individual-frame feature 82.

Figure 5:
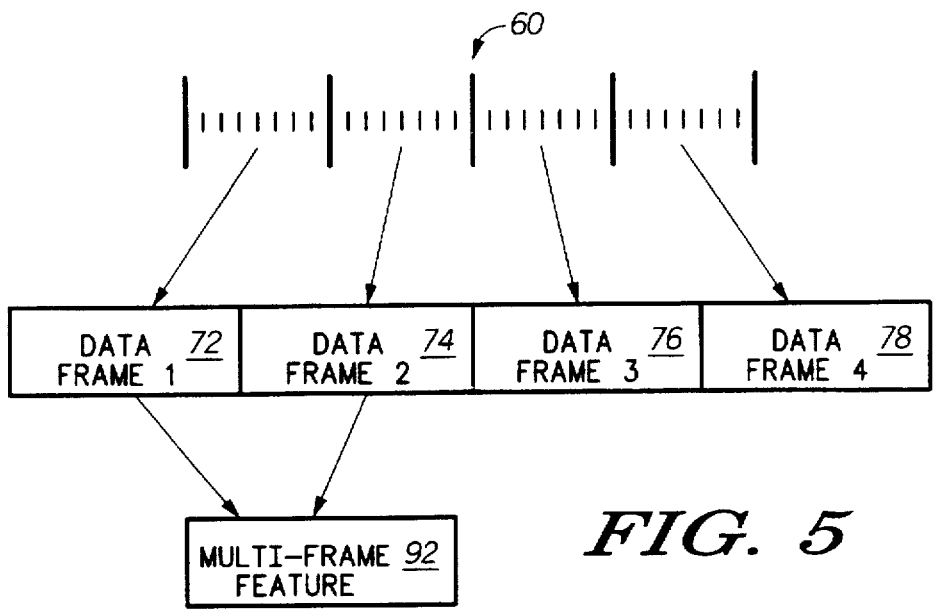
FIG. 5 illustrates a conceptual diagram of extracting a multi-frame feature from two data frames in conformity with a further embodiment of the present invention.

FIG. 5 illustrates a conceptual diagram of extracting a multi-frame feature from two data frames in conformity with a further embodiment of the present invention. Sample sequence 60 is partitioned into a sequence of data frames, depicted by data frames 72, 74, 76, and 78. Multi-frame feature 92 is extracted from data frames 72 and 74.

Although the examples given in FIGS. 3, 4, and 5 show multi-frame features 88, 90, and 92 being respectively extracted from various pairs of data frames and individual-frame features, it will be apparent to one skilled in the art that the extraction of a multi-frame feature may rely on a plurality of data frames, individual-frame features or any combination thereof.

Figure 6:
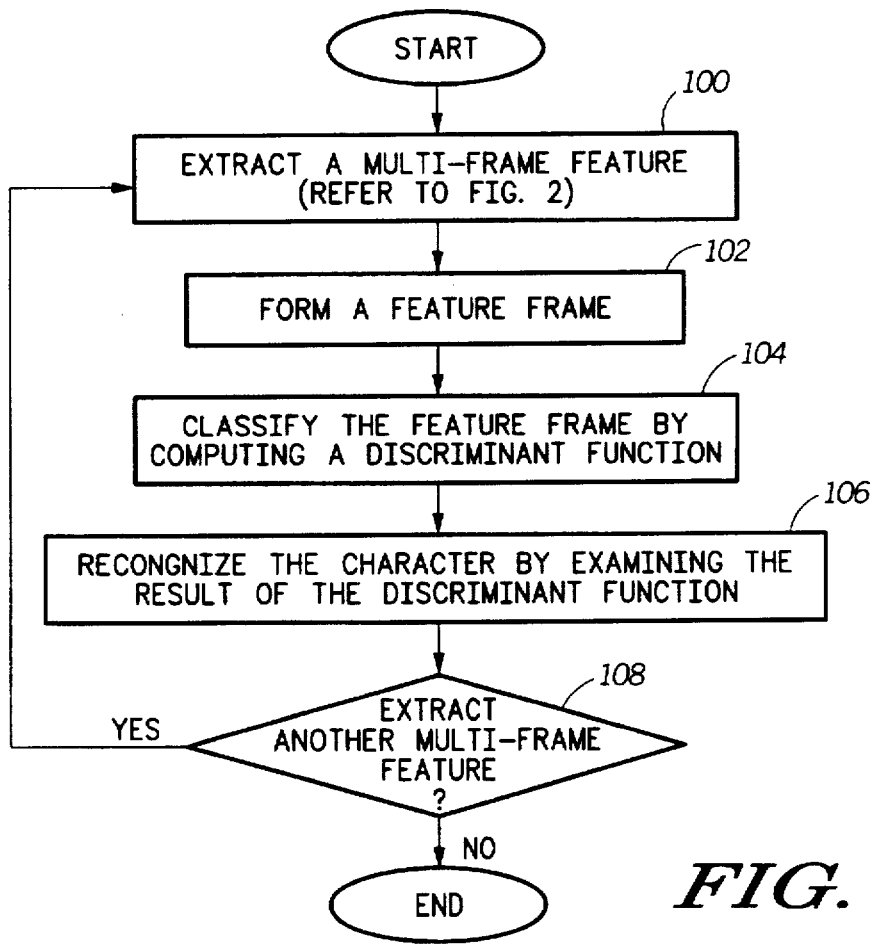
FIG. 6 illustrates a flow diagram of a method of recognizing a character from handwritten text which uses an embodiment of the present invention.

FIG. 6 illustrates a flow diagram of a method of recognizing a character from handwritten text which uses an embodiment of the present invention. In box 100, a multi-frame feature is extracted using the method shown in FIG. 2. Next, in box 102, a feature frame is formed which includes the multi-frame feature. The feature frame may also include data frames or individual feature frames. In box 104, the feature frame is classified by computing a discriminant function. The discriminant function may be a polynomial expansion of the form given by Equation 5. In box 106, the character may be recognized by examining the result of computing the discriminant function. In some instances, it is not possible to identify the character solely on the basis of one feature frame. Thus, in decision box 108, a check is made to determine if another multi-frame feature is to be extracted. If so, the method returns to box 100. If not, the method terminates.

Figure 7:
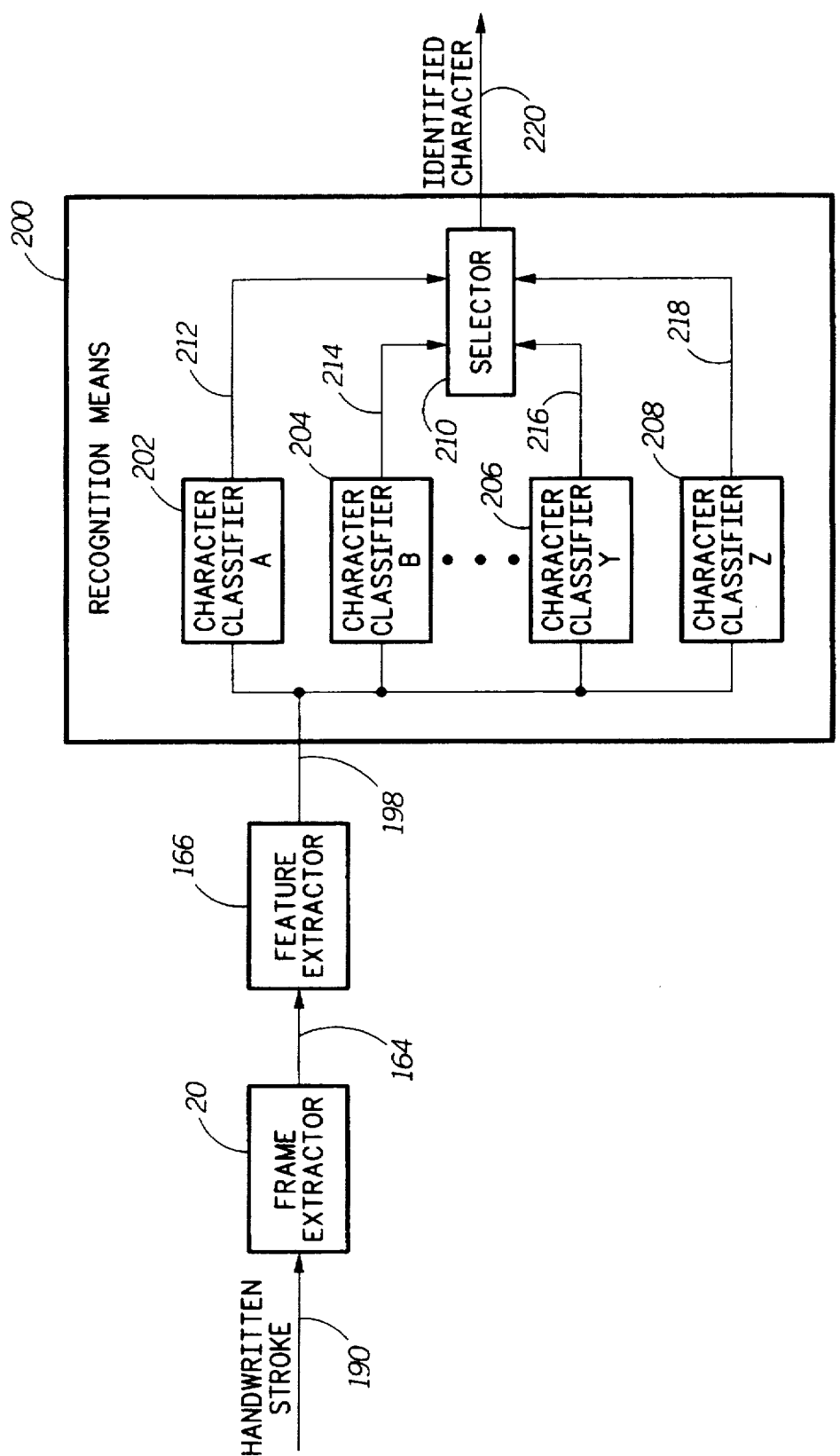
FIG. 7 illustrates a block diagram of a handwriting recognition system which includes an embodiment of the present invention.

Turning now to FIG. 7, a block diagram of a handwriting recognition system which includes an embodiment of the present invention is shown. The handwriting recognition system comprises frame extractor 20, feature extractor 166, and recognition means 200. Recognition means 200, in turn, includes a plurality of classifiers and a selector. Of the plurality of classifiers, character classifiers 202, 204, 206, and 208 are shown.

A handwritten stroke is fed into frame extractor 20 across bus 190. Frame extractor 20 extracts a plurality of data frames from the handwritten stroke. These data frames are then fed via bus 164 to feature extractor 166. Feature extractor 166 creates a set of relevant features. These features are then distributed by bus 198 to a plurality of classifiers included in recognition means 200. In the example given by FIG. 7, four of the plurality of classifiers are shown.

Each classifier implements a different discriminate function. In the example shown, character classifier 202 implements a discriminate function for the character "A"; while character classifier 204 implements a discriminate function for the character "B"; character classifier 206 implements a discriminate function for the character "Y"; and character classifier 208 implements a discriminate function for the character "Z". The discriminate function implemented by each of the classifiers in recognition means 200 is a polynomial expansion of the form given by Equation 1.

The discriminant function implemented by each classifier is based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment of the present invention employs a polynomial expansion of which the general case is represented by Equation 5 as follows:

$$y = \sum_{i=1}^{m} w_{i-1} x_1^{g_{1i}} x_2^{g_{2i}} \ldots x_n^{g_{ni}}$$  Equation 5 where $x_i$ represent the classifier inputs and can be a function such as $x_i = f_i(z_j)$, wherein $z_j$ is any arbitrary variable, and where the indices i, j, and m are any integers; where y represents the output of the classifier; where $w_{i-1}$ represent the coefficient for the ith term; where $g_{1i}, \ldots, g_{ni}$ represent the exponents for the ith term and are integers; and n is the number of classifier inputs.

In the example, the result of the discriminate function implemented by character classifier 202 is passed to selector 210 across bus 212; the result of the discriminate function implemented by character classifier 204 is passed across bus 214 to selector 210; the result of the discriminate function implemented by character classifier 206 is passed across bus 216 to selector 210; and the result of the discriminate function implemented by character classifier 208 is passed across bus 218 to selector 210.

Selector 210 determines which of the classifier output signals has the largest magnitude and then produces a representation of the corresponding character identity on output 220. In one embodiment of the present invention, the representation produced by selector 210 is digital word coded in a computer-readable format. However, one of ordinary skill in the art will appreciate that the representation provided on output 220 may vary in form depending on the application of the system. For example, output 220, as with any of the signals herein described, could be an analog or optical signal.

Feature extractor 166 processes the coordinate pairs of one or more data frames to extract a set of features, or measurements, that contain the same information as the data frame but with reduced dimensionality. Examples of features which may be extracted by feature extractor 166 are average rectilinear velocity, curvilinear velocity, angular velocity, stroke angle, stroke curvature, Fourier coefficients, or coefficients of a polynomial.

In one embodiment of the present invention, feature extractor 166 calculates coefficients of a first order polynomial which is fitted to a curvilinear velocity profile. Feature extractor 166 calculates the coefficients by estimating the instantaneous curvilinear velocity of each coordinate pair. A velocity profile is formed by ordering these estimates sequentially according to the order of the coordinate pairs. The polynomial coefficients are then computed using a least squares technique; in other words, the first order polynomial is fitted to the curvilinear velocity profile. The first order polynomial fitted to the curvilinear velocity profile is represented by Equation 6 as follows:

$$v_{(k)} = a_0 + a_1 v_{(k-2)} + a_2 v_{(k-2)} + a_3 v_{(k-3)}$$ Equation 6 where $V_{(k)}$ represents the curvilinear velocity of the kth coordinate pair; $v_{(k-1)}$ represents the curvilinear velocity of the (k–1)th coordinate pair; $v_{(k-2)}$ represents the curvilinear velocity of the (k–2)th coordinate pair; and $v_{(k-3)}$ represents the curvilinear velocity of the (k–3)th coordinate pair; where k is an integer index; and where $a_0$, $a_1$, $a_2$, and $a_3$ represent coefficients of the polynomial fitted to the curvilinear velocity profile.

In another embodiment of the present invention, feature extractor 166 calculates coefficients of a first order polynomial which is fitted to an angular velocity profile. These coefficients are then passed to trainer 172. These coefficients are then passed to the recognition means 200, or optionally to trainer (not shown). A velocity profile is formed by ordering these estimates sequentially according to the order of the coordinate pairs. The polynomial coefficients are then computed using a least squares technique; in other words, the first order polynomial is fitted to the angular velocity profile. The first order polynomial fitted to the angular velocity profile is represented by Equation 7 as follows:

$$v_{(k)} = b_0 + b_1 v_{(k-1)} + b_2 v_{(k-2)} + b_3 v_{(k-3)}$$ Equation 7 where $v_{(k)}$ represents the angular velocity of the kth coordinate pair; $v_{(k-1)}$ represents the angular velocity of the (k–1)th coordinate pair; $v_{(k-2)}$ represents the angular velocity of the (k–2)th coordinate pair; and $v_{(k-3)}$ represents the angular velocity of the (k–3)th coordinate pair; where k is an integer index; and where $b_0$, $b_1$, $b_2$, and $b_3$ represent coefficients of the polynomial fitted to the angular velocity profile.

The use of a first order polynomial fitted to a velocity profile is based on the fact that the velocity corresponding to the kth coordinate pair can be estimated as a linear combination of the velocities of the three previous coordinate pairs. The polynomial coefficients will quantify the velocity in a distortion invariant manner, thereby increasing the accuracy of the handwriting recognition system.

In one embodiment of the present invention, the system shown in FIG. 7 is implemented by software running on a processor such as a microprocessor. However, one of ordinary skill in the art will recognize that a programmable logic array, ASIC or other digital logic device could also be used to implement the functions performed by the system shown in FIG. 7.

SUMMARY

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a system for recognizing a plurality of characters from a sample of handwritten text, the system utilizing a classifier which responds to a plurality of features extracted from the sample of handwritten text, a method for extracting the plurality of features, the method comprising the steps of:

(a) receiving the sample of handwritten text;

(b) sampling the handwritten text, over time, to form a sequence of sample datum;

(c) partitioning the sequence of sample datum into a temporal sequence of data frames, each of the temporal sequence of data frames including at least two of the sequence of sample datum;

(d) extracting a plurality of individual-frame feature from the temporal sequence of data frames, each of the plurality of individual-frame features having a magnitude and corresponding to one of the temporal sequence of data frames, wherein at least one of the individual-frame features includes a plurality of coefficients of a first order polynomial which is fitted to a curvilinear velocity profile:

$$v_k = a_0 + a_1 v_{(k-1)} + a_2 v_{(k-2)} + a_3 v_{(k-3)}$$

wherein $v_{(k)}$ represents the curvilinear velocity of a kth sample datum, $v_{(k-1)}$ represents the curvilinear velocity of a (k–1)th sample datum, $v_{(k-2)}$ represents the curvilinear velocity of a (k–2)th sample datum, $v_{(k-3)}$ represents the curvilinear velocity of a (k–3)th sample datum, k is an integer index, and $a_0$, $a_1$, $a_2$, and $a_3$ represent the coefficients of the first order polynomial; and (e) extracting a multi-frame feature, corresponding to a specific data frame of the temporal sequence of data frames, from one of:

at least two of the plurality of individual-frame features, at least two of the temporal sequence of data frames, and at least one of the plurality of individual-frame features and at least one of the temporal sequence of data frames.

2. The method of claim 1 wherein the plurality of individual-frame features includes a feature selected from the group consisting of angular velocity, curvilinear velocity, stroke angle, stroke curvature, data frame index, and Fourier coefficients.

3. The method of claim 1 wherein step (d) includes deriving the plurality of individual-frame features from coordinates of the sample of handwritten text, over time, as the sample is written.

4. The method of claim 1 wherein the step of extracting a multi-frame feature includes determining whether a difference between the magnitude of an individual-frame feature extracted from the specific data frame and the magnitude of an individual-frame feature extracted from a data frame adjacent to the specific data frame is less than a threshold value:

(i) if so, setting the multi-frame feature to 1; and (ii) if not, setting the multi-frame feature to 0.

5. The method of claim 1 wherein the step of extracting a multi-frame feature includes setting the multi-frame feature to n, wherein n is a positive integer which indicates that the magnitude of each of the plurality of individual-frame features corresponding to n data frames precedingly adjacent to the specific data frame has persisted within a range.

6. In a system for recognizing a plurality of characters from a sample of handwritten text, the system utilizing a classifier which responds to a plurality of features extracted from the sample of handwritten text, a method for extracting the plurality of features, the method comprising the steps of:

(a) receiving the sample of handwritten text;

(b) sampling the handwritten text, over time, to form a sequences of sample datum.

(c) partitioning the sequence of sample datum into a temporal sequence of data frames, each of the temporal sequence of data frames including at least two of the sequence of sample datum;

(d) extracting a plurality of individual-frame feature from the temporal sequence of data frames, each of the plurality of individual-frame features having a magnitude and corresponding to one of the temporal sequence of data frames, wherein at least one of the individual-frame features includes a plurality of coefficients of a first order polynomial which is fitted to a angular velocity profile:

$$v_k = b_0 + b_1 v_{(k-1)} + b_2 v_{(k-2)} + b_3 v_{(k-3)}$$

wherein $v_{(k)}$ represents the angular velocity of a kth sample datum, $v_{(k-1)}$ represents the angular velocity of a (k−1)th sample datum, $v_{(k-2)}$ represents the angular velocity of a (k−2)th sample datum, $v_{(k-3)}$ represents the angular velocity of a (k−3)th sample datum, k is an integer index, and $b_0$, $b_1$, $b_2$, and $b_3$ represent the coefficients of the first order polynomial; and (e) extracting a multi-frame feature, corresponding to a specific data frame of the temporal sequence of data frames, from one of:

at least two of the plurality of individual-frame features, at least two of the temporal sequence of data frames, and at least one of the plurality of individual-frame features and at least one of the temporal sequence of data frames.

7. The method of claim 6 wherein the plurality of individual-frame features includes a feature selected from the group consisting of angular velocity, curvilinear velocity, stroke angle, stroke curvature, data frame index, and Fourier coefficients.

8. The method of claim 6 wherein step (d) includes deriving the plurality of individual-frame features from coordinates of the sample of handwritten text, over time, as the sample is written.

9. The method of claim 6, wherein step (e) includes the sub-step of:

generating the multi-frame feature based on a comparison of magnitudes of at least two of the individual-frame features.

10. The method of claim 6 wherein step (e) includes the sub-step of:

setting the multi-frame feature to n, wherein n is a positive integer which indicates that the magnitude of each of the plurality of individual-frame features corresponding to n data frames precedingly adjacent to the specific data frame has persisted within a range.

11. In a system for recognizing handwritten text, a sub-system for extracting a plurality of features, the sub-system comprising:

a frame extractor partitioning a sequence of sample datum derived from the handwritten text into a temporal sequence of data frames, each of the temporal sequence of data frames including at least two of the sequence of sample datum; and a feature extractor for extracting a plurality of individual-frame features and a multi-frame feature from the temporal sequence of data frames, wherein at least one of the individual-frame features includes a plurality of coefficients of a first order polynomial which is fitted to a velocity profile $$v_k = b_0 + b_1 v_{(k-1)} + b_2 v_{(k-2)} + b_3 v_{(k-3)}$$

wherein $v_{(k)}$ represents the velocity of a kth sample datum, $v_{(k-1)}$ represents the velocity of a (k−1)th sample datum, $v_{(k-2)}$ represents the velocity of a (k−2)th sample datum, $v_{(k-3)}$ represents the velocity of a (k−3)th sample datum, k is an integer index, and $b_0$, $b_1$, $b_2$, and $b_3$ represent the coefficients of the first order polynomial.

12. The sub-system of claim 11 wherein the velocity profile is an angular velocity profile.

13. The sub-system of claim 11 wherein the velocity profile is an curvilinear velocity profile.

14. The sub-system of claim 11 wherein the plurality of individual-frame features includes a feature selected from the group consisting of angular velocity, curvilinear velocity, stroke angle, stroke curvature, data frame index, and Fourier coefficients.

15. The sub-system of claim 11 wherein the plurality of individual-frame features are extracted from the sample of handwritten text as the sample is written.

16. The sub-system of claim 11 wherein the feature extractor generates a multi-frame feature based on a comparison of at least two of the individual-frame features.

17. The sub-system of claim 11 wherein the feature extractor sets a multi-frame feature to n, wherein n is a positive integer which indicates that a sequence of n individual-frame features has persisted within a range.

* * * * *